United States Patent [19]
Taylor et al.

[11] Patent Number: 5,429,013
[45] Date of Patent: Jul. 4, 1995

[54] CLIMBING HANDLES FOR ROAD BICYCLES

[76] Inventors: Michael L. Taylor, P.O. Box 851573, Mesquite, Tex. 75185; Bobby L. Richard, 403 Barton, Mesquite, Tex. 75149

[21] Appl. No.: 846,254

[22] Filed: Feb. 27, 1992

[51] Int. Cl.⁶ .............................................. B62K 21/16
[52] U.S. Cl. .................................... 74/551.1; 74/551.8
[58] Field of Search ................ 74/551.8, 551.3, 551.1

[56] References Cited

U.S. PATENT DOCUMENTS

| | | | |
|---|---|---|---|
| 567,663 | 9/1896 | Snyder | 74/551.1 |
| 586,678 | 7/1897 | Walsh | 74/551.8 |
| 587,626 | 8/1897 | Vollmer | 74/551.9 |
| 599,564 | 2/1898 | Kintner | 74/551.9 |
| 615,793 | 12/1898 | Bowman | 74/551.9 |
| 3,289,493 | 12/1966 | Church | 74/551.8 |
| 4,337,962 | 7/1982 | Allen et al. | 74/551.1 X |
| 4,750,754 | 6/1988 | Lennon | 74/551.8 X |
| 4,878,397 | 11/1989 | Lennon | 74/551.1 |
| 4,951,525 | 8/1990 | Borromeo | 74/551.1 |
| 5,024,119 | 6/1991 | Linden | 74/551.1 |
| 5,033,325 | 7/1991 | Giard, Jr. | 74/551.8 X |

FOREIGN PATENT DOCUMENTS

| | | | |
|---|---|---|---|
| 794122 | 2/1936 | France | 74/551.8 |
| 12305 | of 1896 | United Kingdom | 74/551.1 |
| 13053 | of 1896 | United Kingdom | 74/551.1 |
| 405737 | of 1909 | United Kingdom | 74/551.8 |

Primary Examiner—Rodney H. Bonck
Assistant Examiner—Ryan W. Massey

[57] ABSTRACT

Climbing handles for road bicycles that mount on each side of the stem. The handles are to be set forward and above, in a parallel relationship to the standard handlebars. The climbing handles must be permanently and securely welded to clips that attach securely to the handlebars of a road bicycle. The top clips have a platform for the purpose of locating the climbing handles in the proper relationship to the standard handlebars. Bottom clips which correspond to the top clips are used to attach the climbing handles to standard bicycle handlebars.

4 Claims, 10 Drawing Sheets

CLIMBING HANDLES FOR ROAD BICYCLES

BACKGROUND OF THE INVENTION

1. Field of the invention

Our invention relates to bicycle accessories in general and to handlebar accessories for road bicycles in particular, it is a bicycle accessory conceived, designed, developed, tested and proved for the expressed purpose of restoring the relationship between a cyclist's shoulders and his hands. This relationship is altered when a cyclist is riding uphill on a bicycle. Our invention restores this relationship while riding uphill, thus making the cyclist stronger and more efficient while climbing hills.

2. Origin of the invention

The original concept or our invention was that the climbing handles would come directly off the top of the standard handlebar, it was to be fastened with two identical clips to the bicycle handlebars and the climbing handles were to be attached directly on top of the clips. However, in developing our first prototype it was a matter of convenience to make the climbing handles on clips that placed them in front of the handlebars instead of off the top. We also discovered through testing and practicing climbing, that this was the preferred design. The following paragraphs explain briefly how the invention was developed and why the climbing handles need to be set forward of the existing bicycle handlebars. A. We occasionally used part or another bicycle accessory which is mounted in front of the handlebars to gain advantage when climbing. As a result, we set about to design a new bicycle accessory whose expressed purpose was to improve cyclists ability to climb.

B. The aesthetics of any product is of major importance to the cycling community. In our judgement the front mounted design is much more aesthetically appealing than the top mounted version.

C. While riding with the first prototype we discovered that the climbing handles should be rotated forward to facilitate optimum benefit while climbing. This is true because it is necessary to set the climbing handle forward of the standard handlebars in order to restore the proper relationship between the cyclist shoulders and his hands while going uphill.

D. After riding for several weeks with the first prototype, it was believed by both my partner and myself that we had a viable invention. We then began to consider the actual assembly and design of the climbing handles. The original design was that the climbing handles were to have a wedge nut assembly that allowed for vertical adjustment. However, in actual use this was not a safe design because the left climbing handle had a tendency to rotate backward and loosen itself. We then chose another design. It called for welding the climbing handle to the top clip. With this design we began to search for a clip to use as a top clip that would be suitable for welding the climbing handle to. We could not find a suitable substitute so it was decided that we would proceed with the design and purchase a die for our clips. This die incorporated the features discussed herein having to do with locating the climbing handles in front of the bicycle handlebars. This was accomplished by using what we call a "platform" clip.

E. The distance of the climbing handles horizontal grip from the handlebar is of critical importance. The original prototype was 2½" from the bicycle handlebar to the climbing handles horizontal grip. On the second prototype an alternate design of attachment to the clip was used which shortened the distance from the bicycle handlebar to the climbing handle grip to 2". This change proved to be detrimental in that it caused interference when riding on the "hoods". The interference was at the cyclist wrist. When riding on the hoods with prototype 2 the climbing handles rubbed against our wrists. So the design requires that the distance between the climbing handles horizontal grip and the handlebar be no less than 2½".

DESCRIPTION OF PRIOR ART

It is an established fact that hills are one or the greatest challenges that cyclist's must confront. There is a need for a product that can help cyclists climb hills more efficiently and with greater strength. In the prior art, there are a number of inventions that attach to the handlebars of a bicycle. However, no patents were found in our patent search which were designed to solve the problem of the altered relationship between the cyclist's shoulders and the handlebars of the bicycle caused from going uphill. Some of the prior art patents are discussed below, while there are some which deal with body position there are none that deal with this problem in general or specific.

The Volmer U.S. Pat. No. 587,626 shows a handle grip attached on each side of the stem. However, the design of the grip shows that it is to be pointed back toward the cyclist. This represents a very dangerous threat to cyclist. In the case of an accident, these handles might jab into the cyclist, causing both external and internal injuries. It also changes the natural way in which the hand grips the handle of a bicycle. This unnatural grip is 90 degrees from the standard grip which could cause a loss of steering control. Both of these features would be unsafe for the cyclists. This invention would benefit nothing toward restoring the relationship between the cyclist shoulders and his hands while riding uphill. Further, it does nothing to aid the cyclist in climbing hills, nor does the inventor make these claims.

The Kintner U.S. Pat. No. 599,564 is also a handlebar accessory. While it looks similar to our invention, there are a number of reasons why this invention is not suitable for use as a climbing handle. First, in the area of materials. His invention is chiefly made from steel, both in the standard and the clamp bolts. Steel is too heavy a material to be acceptable to todays cyclists. The weight and materials of accessories are critical. In our invention, the handles and the clips are made from 6063-T5 and 6061-T6 aluminum respectively. As a result, the materials used in our invention show a marked improvement over the materials from the above referenced invention. Secondly, in the area of design, the inventors handlegrip, which is detachable from the standard, is not acceptable because it poses safety risks that could endanger the cyclist. Because the handles are adjustable and detachable, they cannot safely be used as a climbing handle as our invention is designed to be used. For example, when a cyclist is riding uphill pulling back on the handles, the left handle would loosen by rotating toward the rider. At the same time, the right handle would tighten by rotating in the opposite direction. This would make it impossible to use these handles for leverage while climbing hills. The consequence is that the rider who pulls back on these handles could tumble off the bicycle backwards. The same danger is present if the rider were using the Kintner invention while going downhill, which the inventor suggests as an occasion to use his handles. If the rider was to position the grips of this invention in the center of the standards the likelihood of this type of accident would be lessened, but would not be eliminated. Third, in the configuration noted above, the steel clamp which holds the handle would not allow a firm and secure grip, as it would be located in the center of the palm. Most cyclists today ride with gloves that are padded in the palms. This would make a strong secure grip impossible. Fourth, the inventor states that the rider can vary the angular relation of the grips and may vary the height. The ability to vary the height is the cause of the safety risks discussed above. Simply rotating the grips does not meet the need to restore the proper relationship between the cyclist shoulders and his hands while riding uphill. In our invention, this is accomplished because our invention is first set forward of the standard handlebar position via the "platform clip", and then rises above them. This design is what makes our invention effective because it locates the handles further away from the cyclist, and then they may be rotated away at an angle which gives the proper relationship to the shoulders and the hands when climbing, thus making the cyclist more efficient while climbing hills. It should be noted that the intention of the inventor was not to invent a product that helped cyclists climb hills. Nor did he intend to make a product that would restore the proper relationship between the cyclist shoulders and his hands while going uphill.

The Bowman U.S. Pat. No. 815,793 is a handlebar accessory. The objective of this invention is to "permit the rider when going slowly to occupy an erect position". In addition, the inventor states that this invention may also include a device fop carrying a lantern or baggage or a flag. It is however, not designed in any way to correct the altered relationship between the cyclist shoulders and his hands. Nor is it designed to aid cyclists in climbing hills. The inventor makes no such claim. To occupy an erect position on a bicycle is detrimental to the fast paced riding done today because cyclists do all that is possible to eliminate wind resistance. Further, the attachment for carrying the listed articles would present a danger to cyclist in this day and time, and would not be acceptable for the type of competitive, recreational and fast riding done today.

The Lennon U.S. Pat. No. 4,750,754 has as an embodiment of the invention, an accessory for existing handlebars. <See column 4 line 24 ff. This accessory is to be attached to each side of the stem with (2) tow piece clamps, held together with bolts. The object of this accessory is the same as the preferred design of the invention, which is to provide a handlebar system which encourages the rider to assume an efficient and comfortable position, which can be sustained for long periods of time. However, the purpose of the invention is not to restore the relationship between the cyclists shoulders and his hands while going uphill, and it cannot be used for this purpose because of its design. The inventor makes no claim that this invention aids cyclists in any way while climbing hills. Further, while this embodiment of his invention does employ the use of a two piece clamp, this clamp is in no way capable of serving the same purpose as the "platform" clip does for our invention.

The Lennon U.S. Pat. No. 4,878,397 shows a handlebar, not a handlebar accessory. In the detailed description of the invention, column 4 line 62 through 64, the inventor makes mention of the rider grasping the grips adjacent to the stem clamp during climbing. It should be understood that this grip location is no different than grabbing hold of what is commonly called the bar tops. It does not restore the relationship between the cyclist shoulders and his hands while riding uphill. Further, it is of no added benefit to cyclists while climbing hills. This invention is not designed to benefit the cyclist while climbing hills, nor does the inventor make that claim.

The Borromeo U.S. Pat. No. 4,951,525 is a handlebar and not a handlebar accessory. In the detailed description column 2 line 34 through 39, the inventor states that a gripping position allows the rider to "straighten his body so as to facilitate the ventilation of the lungs." However, because this invention is a different type handlebar, it eliminates the standard handlebar positions which cyclists find useful and necessary. This invention does nothing to restore the relationship between the cyclist shoulders and his hands while riding uphill. Further, it does not offer any benefit to the cyclist for climbing hills, nor does the inventor make that claim. Our invention allows the cyclist to "ventilate the lungs" while going uphill because it allows the cyclist to occupy a position which does not compress the diaphragm. Our invention does not take away any of the standard hand positions which cyclists find useful and necessary.

The Linden U.S. Pat. No. 5,024,119 is also a handlebar and not a handlebar accessory. It's stated purpose is to allow the rider to assume an upright position on the bicycle for greater comfort while commuting or touring. The invention does nothing to restore the relationship between the cyclists shoulders and hands while climbing hills. Further, while this invention will allow the rider more comfort, it eliminates several of the standard hand positions which bicycle riders find useful and necessary. Our invention, while allowing the rider more comfort by restoring the proper relationship between the shoulders and the hands, also offers improved efficiency while climbing without sacrificing any of the standard hand positions.

SUMMARY OF THE INVENTION

The objectives of our invention are as follows; First, a handlebar accessory which is designed for secure attachment, strength and stability with minimum weight and an aesthetic value acceptable to the contemporary cyclist's taste. Second, to provide a means of restoring the proper relationship between the cyclists shoulders and his hands while riding uphill. Third, by so doing, to enable the cyclist to take in sufficient oxygen to facilitate increased efficiency by spinning the pedals while riding up hill. Fourth, to provide a means whereby the cyclist may use leverage to propel himself up a hill while staying in the seated position using the top portion of the quadricep rather than the area of the quadricep Just above the knee.

DETAILED DESCRIPTION

The invention will be referred to as a climbing handle throughout this description. The climbing handles have a simple construction made up of two units, each having seven parts. This description will consist of Instructions on how to make and install one side. It should be understood that the two parts of this invention ape handed and must be considered as such during production and installation.

Figure 1A:
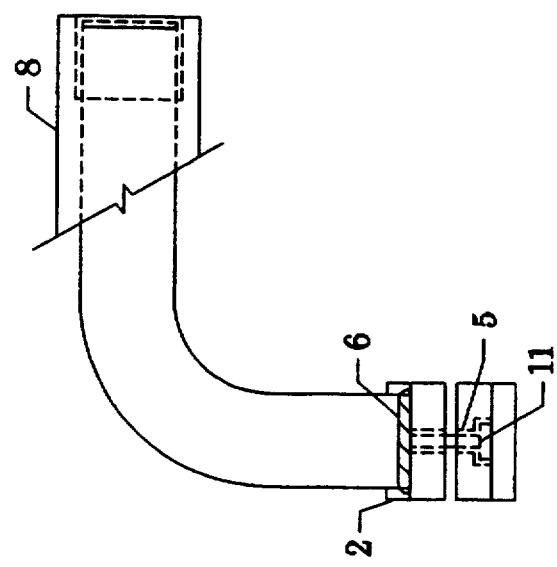
FIG. 1 is a frontal view of the preferred design or the climbing handle.
Figure 1B:
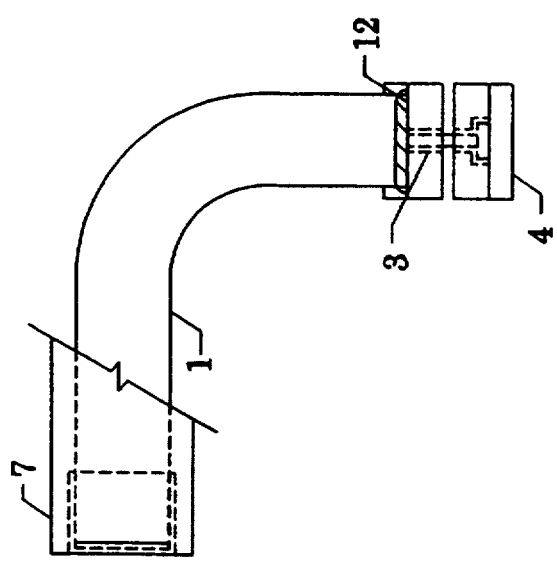
Figure 2:
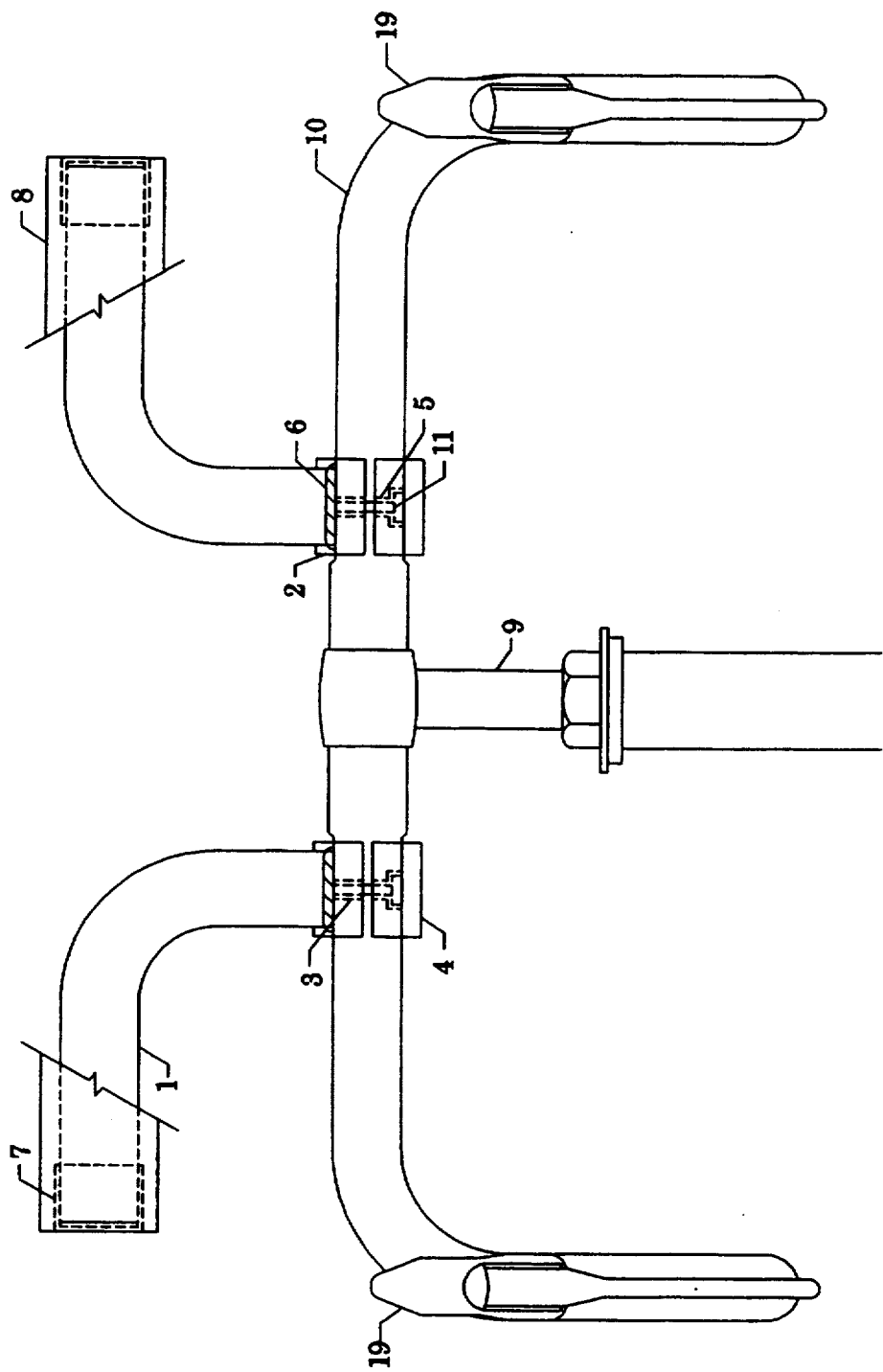
FIG. 2 is a frontal view of the preferred design of the climbing handle installed on standard handlebars.
Figure 4:
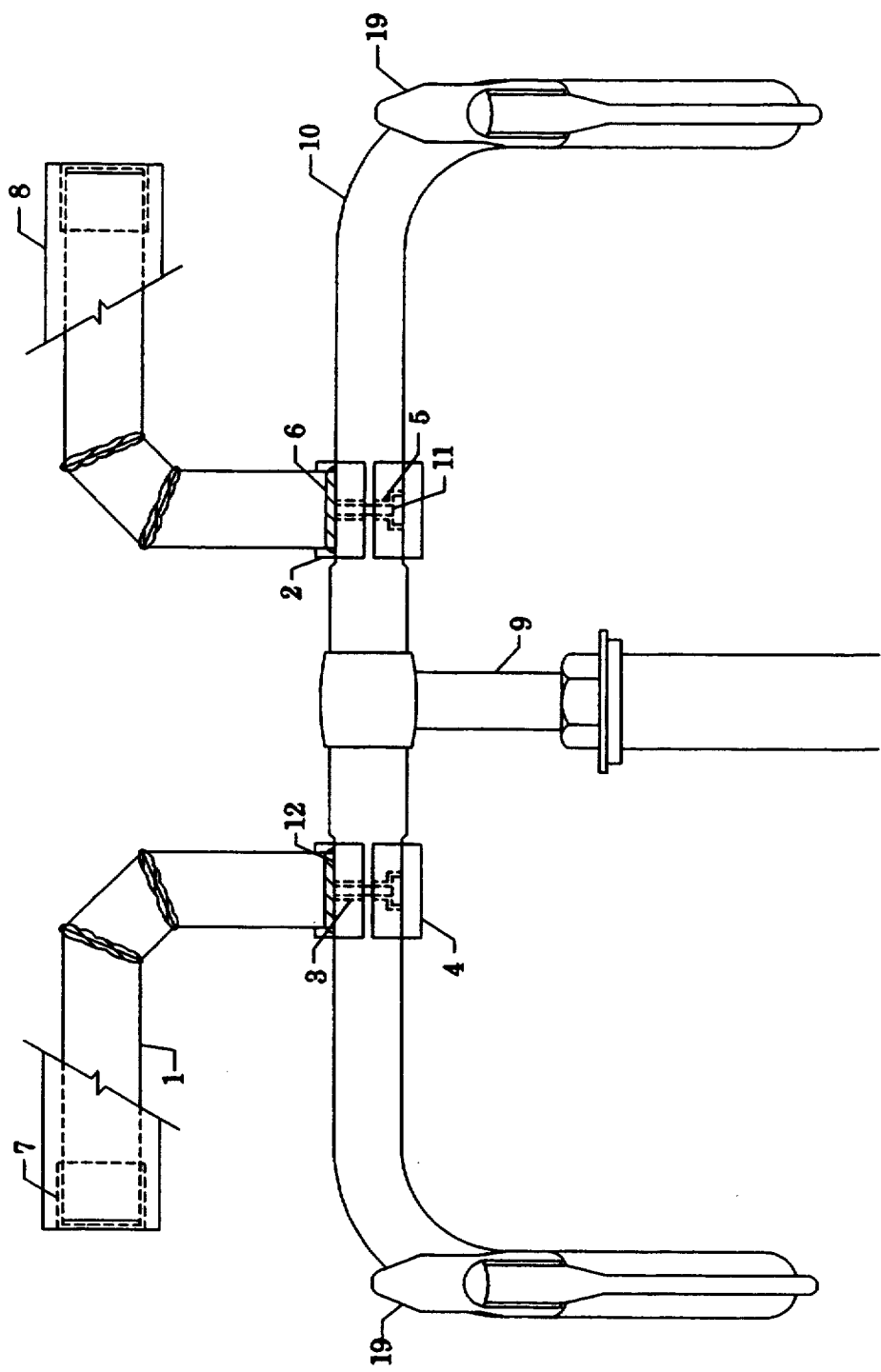
FIG. 4 is a frontal view of an alternate means of constructing the climbing handle installed on standard handlebars.

The climbing handles FIG. 1 are formed from 6063-T5 aluminum. The handle 1 is curved using a hydraulic tube bender with a radius block and a wiper die made specifically for the size of tubing used to produce the handle 1 and at the specific radium of the desired end product. The tubing must be securely clamped into the press before being curved. A ball mandrel must be inserted into the tube during the curving process in order to prevent the wall or the tube from collapsing while curving. The climbing handle 1 for a bicycle comprising, a curved or fabricated tube, should be curved to exactly 90 degrees. Once removed from the hydraulic press, the handle 1 must be cut to proper length. The handle 1 may also be constructed by welding three pieces of mitered tubing in an assembly as shown in FIG. 4, this is however, not the preferred design.

Figure 8A:
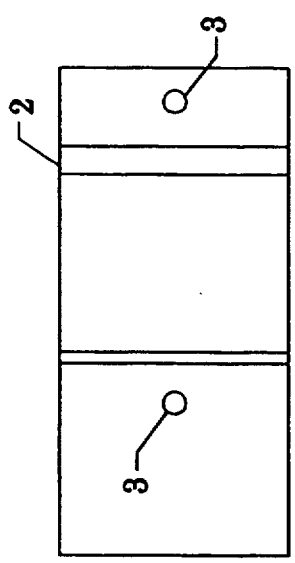
FIG. 8A is a profile view of the "top clip".
Figure 8B:
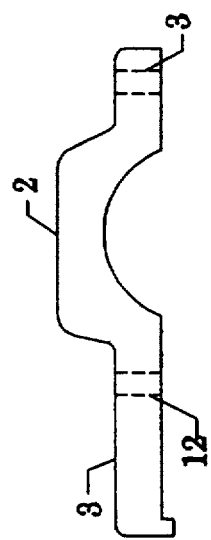
FIG. 8B is a top view of the "top clip".

FIGS. 8A and 8B show the top clip 2 having threaded screw holes 3, is a custom extrusion made from 6061-T6 aluminum. The first step is to cut the top clip 2 to the proper length. Once the top clip 2 is cut to length, screw holes 3 must be drilled and tapped for a 5 mm screw 11. The screw holes must be fabricated to a tolerance of +/−0.005. When fabrication is completed the top clip 2 should be tumbled to clean and de-burr the part.

Figure 7B:
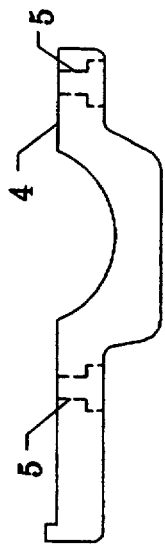
FIG. 7B is a bottom view of the "bottom clip".
Figure 7A:
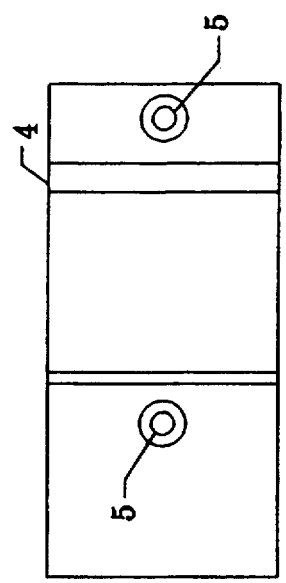
FIG. 7A is a profile view of the "bottom clip".

FIGS. 7A and 7B show a corresponding bottom clip 4 having clear screw holes 5 that is also a custom extrusion made from 6061-T6 aluminum. The bottom clip 4 must first be out to the proper length. Once the bottom clip 4 is cut to length, clear holes 5 must be drilled and counter bored. When fabrication is completed the bottom clip 4 should be tumbled to clean and de-burr the part.

Figure 5:
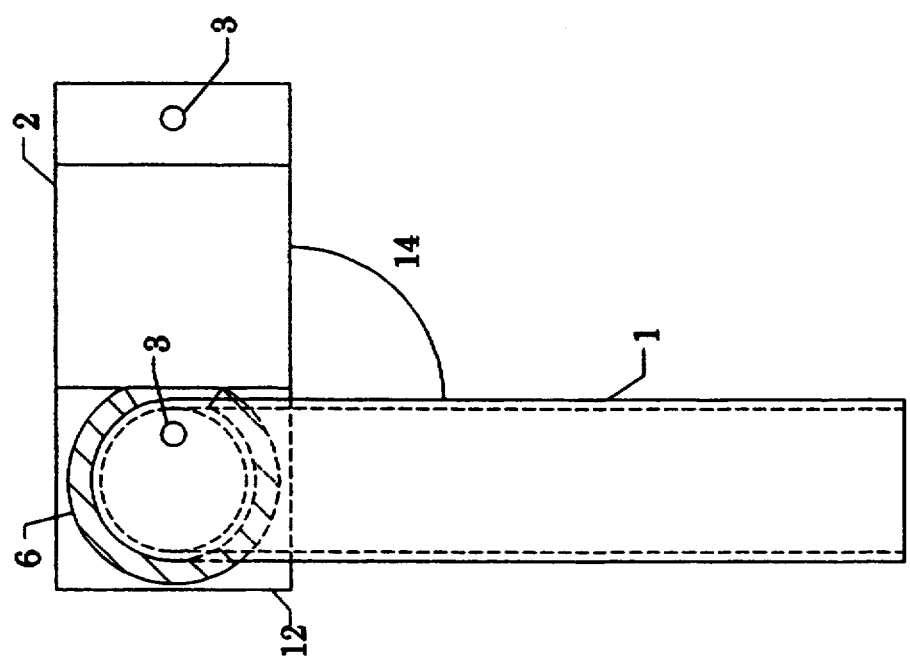
FIG. 5 is a top view of the climbing handle.

After the handle 1 is formed and the top clip 2 is fabricated and tumbled, the handle 1 is to be attached to top clip having a platform 12. The platform 12 of the top clip 2 is very critical to the proper function of the climbing handles. The platform 12 is required, to attain a relationship forward of the top bar of the existing handlebars, away from the rider. The platform 12 locates the handle 1 being parallel to and above the horizontal plane of the top bar of a bicycle handlebar, in order to give back to the cyclist, the leverage taken away by the hill. The handle 1, attached by means of a weld 6 so as to permanently and securely attach said handle 1 to said top clip platform 12. The assembly of the handle I to the top clip 2 must have a 90 degree relationship 14 as shown in FIG. 5. The weld 6 that joins the handle 1 to the top clip 2 is 270 degrees as shown in FIG. 5. After the assembly of the handle 1 to the top clip 2 is completed, the assembled part should be tumbled to clean.

After the handle 1, and the top clip 2 assembly have been cleaned, the plastic protective end caps 7 should be installed. After the end cap 7 is installed the foam grip 6 should be installed over the cap 7 and the handle 1. It is advisable to use a lubricant when installing the sponge grip 8. The grip 8 should be pushed down to cover the weld 6 which attaches the handle 1 to the top clip 2.

Figure 3:
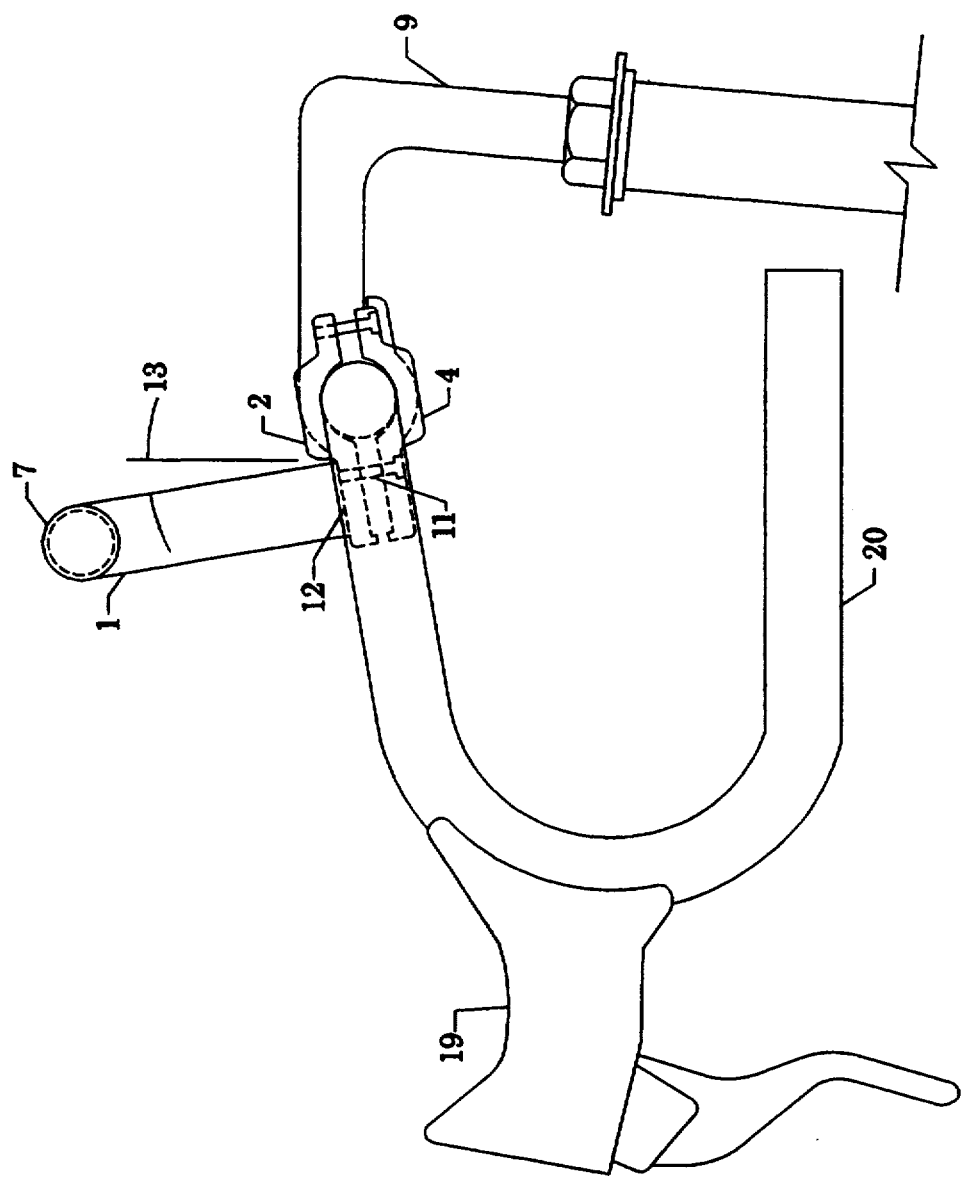
FIG. 3 is a side profile of the preferred design of the climbing handle installed on standard handlebars.

The climbing handles FIG. 1 are now ready to be installed by being attached to the handlebars 10 of a bicycle, by installing screws 11 through said clear holes 5 in said bottom clip 4 into said threaded holes 3 of said top clip 2. The climbing handles should be located adjacent to the stem 9 one each side of the handlebar. The top clip 2 with the handle 1 attached should be positioned on top of the handlebars 10 and the bottom clip 4 should be placed on the underside of the handlebar 10 in like fashion. The bottom clip 4 should be attached to the top clip 2 using two 5 mm screws 11. Before tightening the screws 11 the climbing handles should be rotated forward as shown in FIG. 3. The degree of rotation 13 is determined by the type of terrain the cyclist will be riding on. Generally speaking, the degree or rotation 13 should be between ten and twenty degrees for greatest efficiency.

The climbing handles FIG. 1 work because they restore the normal relationship between the cyclists shoulders and the handlebars of his bicycle while going up hill.

The most efficient way to climb hills is to spin the pedals 25 at high cadence while remaining seated. However, in the physiology of riding up hills there is a series or cause and effect adjustments whose end result is the loss or efficiency. The following is a summary of this sequence.

Figure 9:
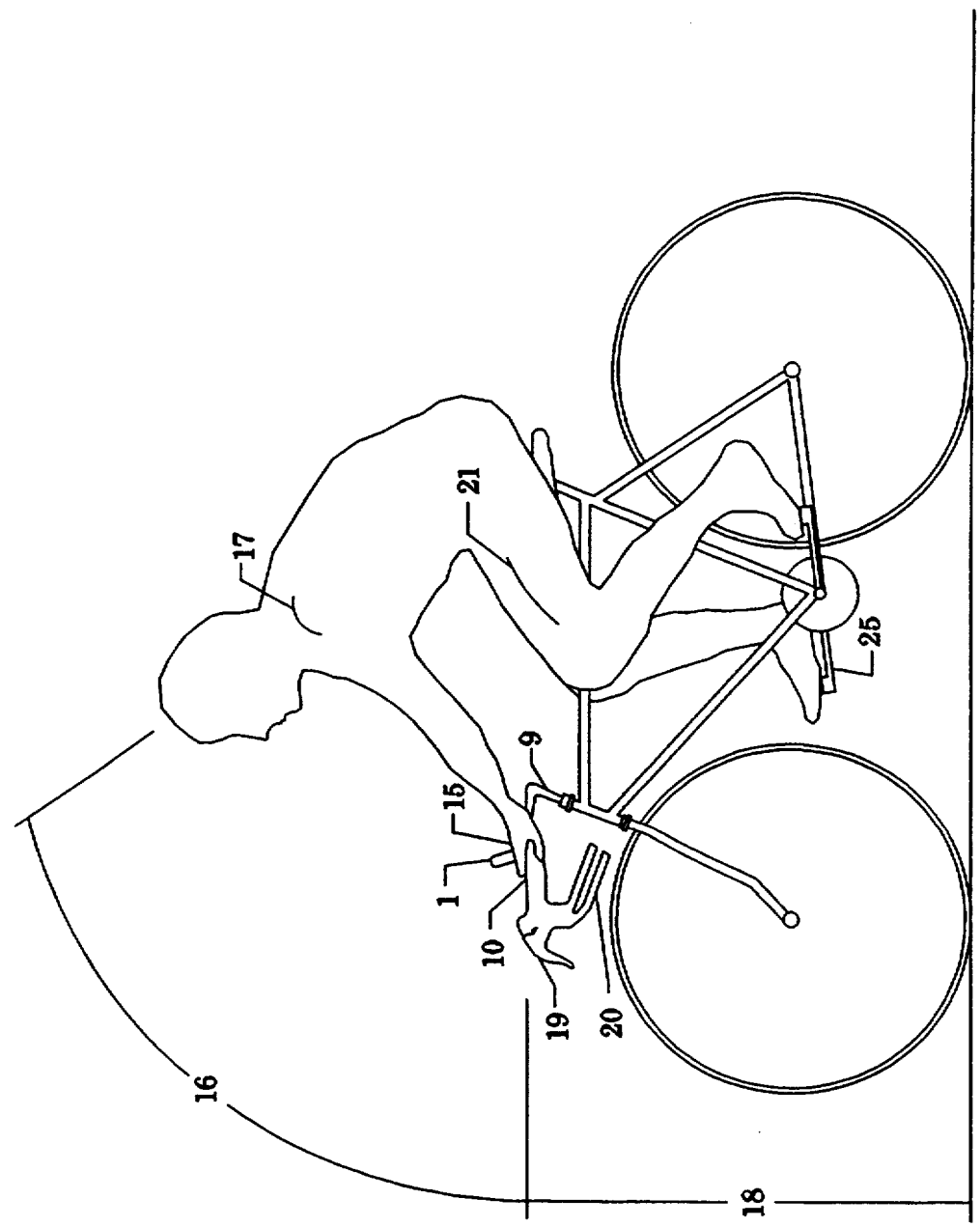
FIG. 9 is a view of a cyclist in the typical riding position, while riding on level ground with hands on the bar tops.
Figure 10:
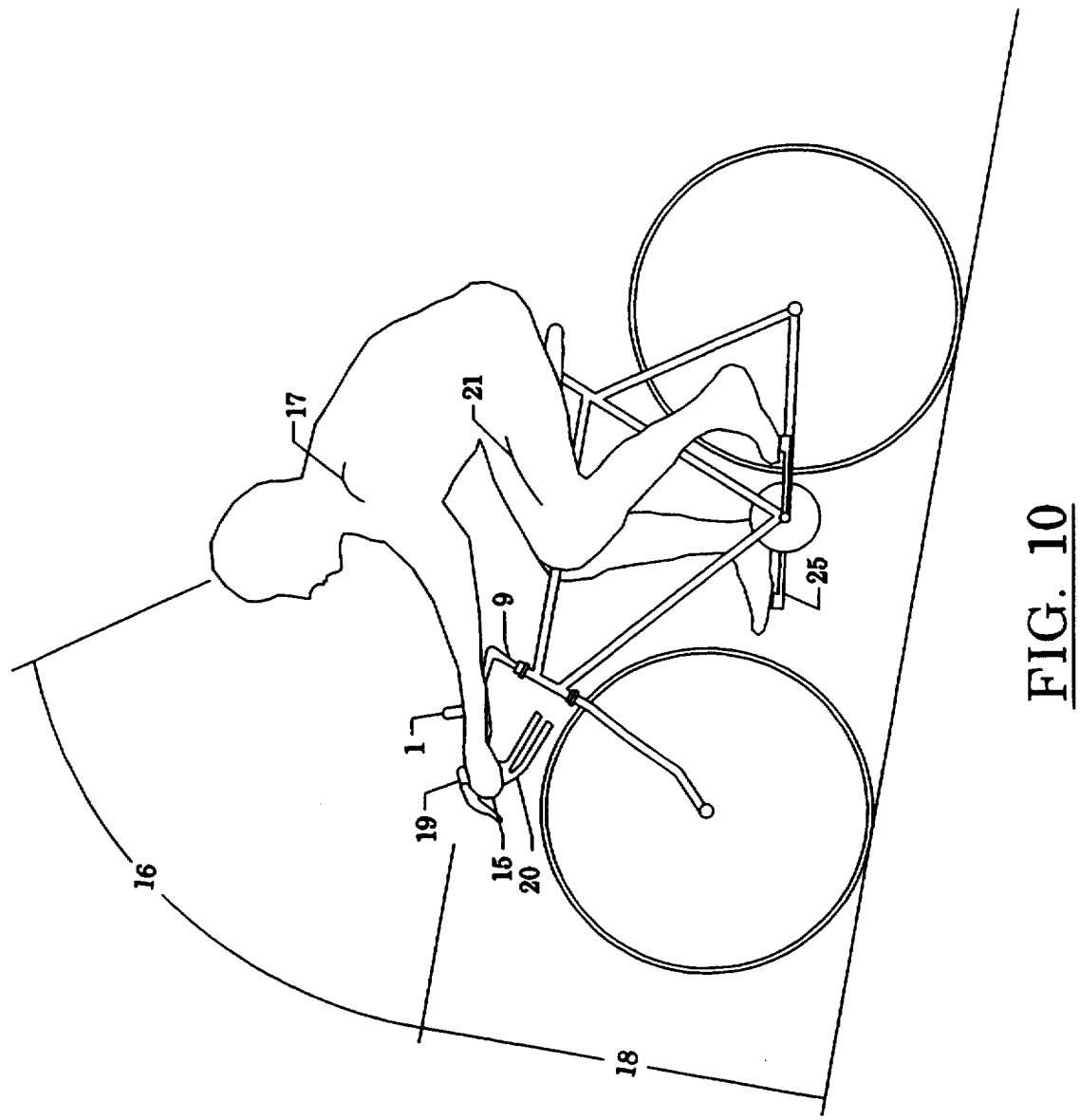
FIG. 10 is a view of a cyclist in the typical riding position while riding up a hill with hands on the hoods.
Figure 11:
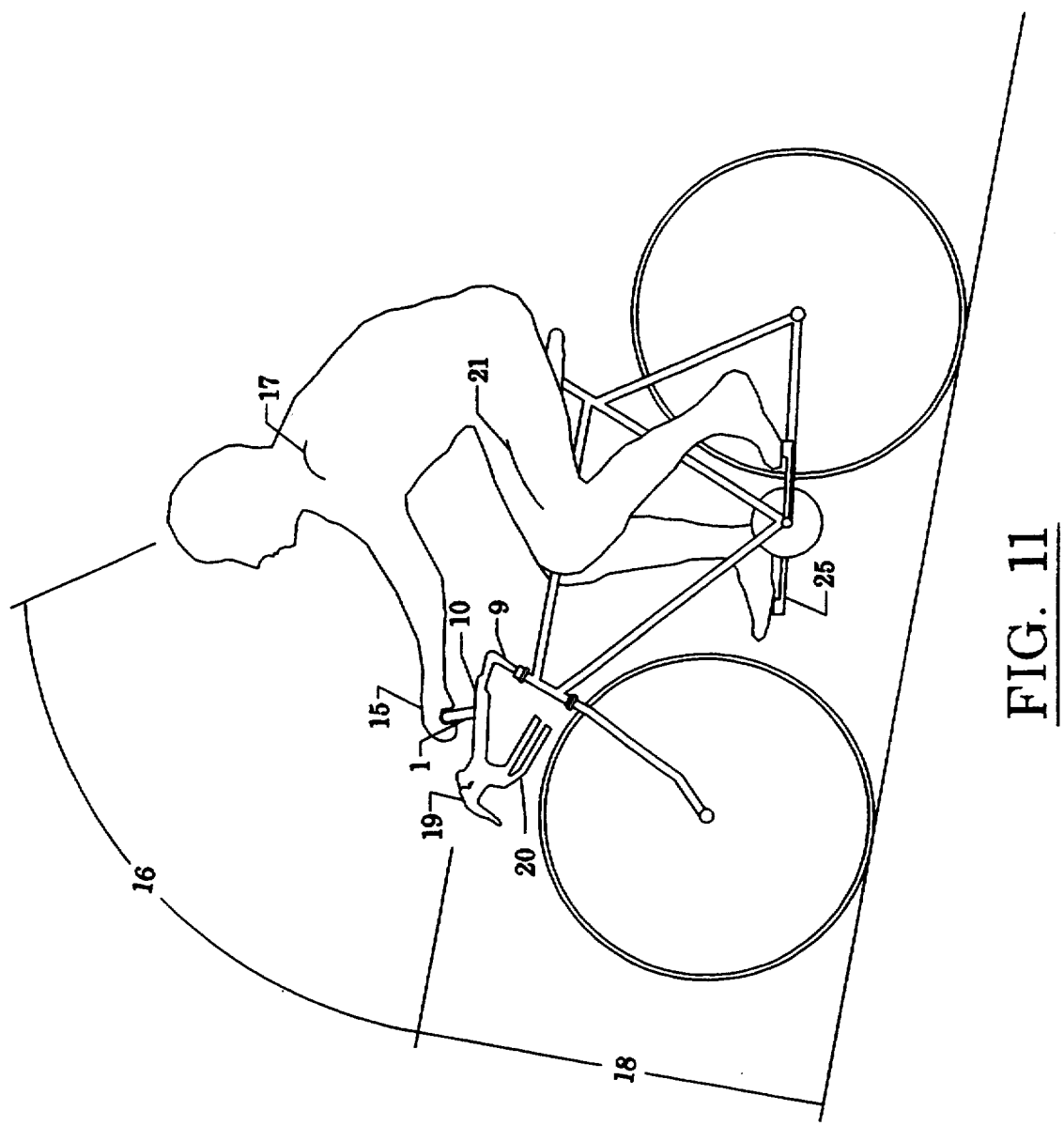
FIG. 11 is a view of a cyclist using the climbing handles while riding uphill.

As a cyclist rides on level ground FIG. 9 he generally sits in a position with his hands 15 on the bar tops 10. As the cyclist begins to go uphill FIG. 10 and the grade of the hill increases, the relative angle 16 between the riders shoulders 17 and the handlebar top 10 or the bicycle changes. The reason for this change is that while the bicycle is at an angle 18 parallel to the hill, the rider is essentially in the same position as when he was riding on flat terrain FIG. 9. To compensate for this change in the relative angle between the cyclist shoulders 17 and the handlebar top 10 it is normal for the rider to change his position on the bicycle by grasping the hoods 19 or the drops 20. This adjustment requires the cyclist to bend over further at the waist which compresses the diaphragm and restricts his breathing. The diaphragm is the chief muscle used in breathing. When a person takes a breath, the diaphragm moves downward and becomes fiat, allowing the lungs to fill with air. When a person exhales the diaphragm curves up toward the chest and the air is forced out of the lungs. However, when the person is a cyclist going uphill on a bicycle, the diaphragm is compressed. This makes it impossible for the diaphragm to curve upward allowing the cyclist to breath properly. As a result, the cyclist can not take in sufficient oxygen to fuel the leg muscles which makes him unable to spin the pedals 25. When the cyclist can no longer spin, he must push the pedals 25 using high pressure on the down stroke. This leads to a build-up of lactic acid in the quadricep 21 just above the knees. The build-up of lactic acid feels like a burning sensation and is very painful. It causes the cyclist to loose power and efficiency while climbing hills. The final adjustment is that the rider stands up on the bicycle and pedals up the hill by shifting his weight from one side of the bicycle to the other. This is the most inefficient way to climb. Thus the problem is this; Riding uphill on a bicycle requires changes by the cyclist that inevitably lead to the loss of efficiency. When the cyclist begins to go upgrade and reaches out and up to take hold or the climbing handles 1 it will meet a number or needs which the cyclist has while climbing. First, even though the handlebars or the bicycle 10 have come toward the cyclist while going uphill the relative angle 18 between the cyclists shoulders 17 and his 15 hands has been restored to the relationship held while riding on level ground. Thus the cyclist is able to climb with greater efficiency, strength and comfort without sacrificing any of the standard hand positions which cyclist rind useful and necessary. Second, by climbing while grasping the climbing handles FIG. 11, the cyclist will be in a more upright position which does not compress the diaphragm. This will allow him to take in sufficient oxygen throughout the climb. This will delay the build up of lactic acid in the quadricep 21. Third, the climbing handle gives the cyclist a means where by he is able to get and use leverage to propel himself up hills as never before.

Another embodiment of our invention addresses a need caused by the proliferation of handlebar accessories on the market. What is lost with the use or many of these accessories is standard hand positions and a convenient place for locating other accessories like head lamps and computers.

Figure 6:
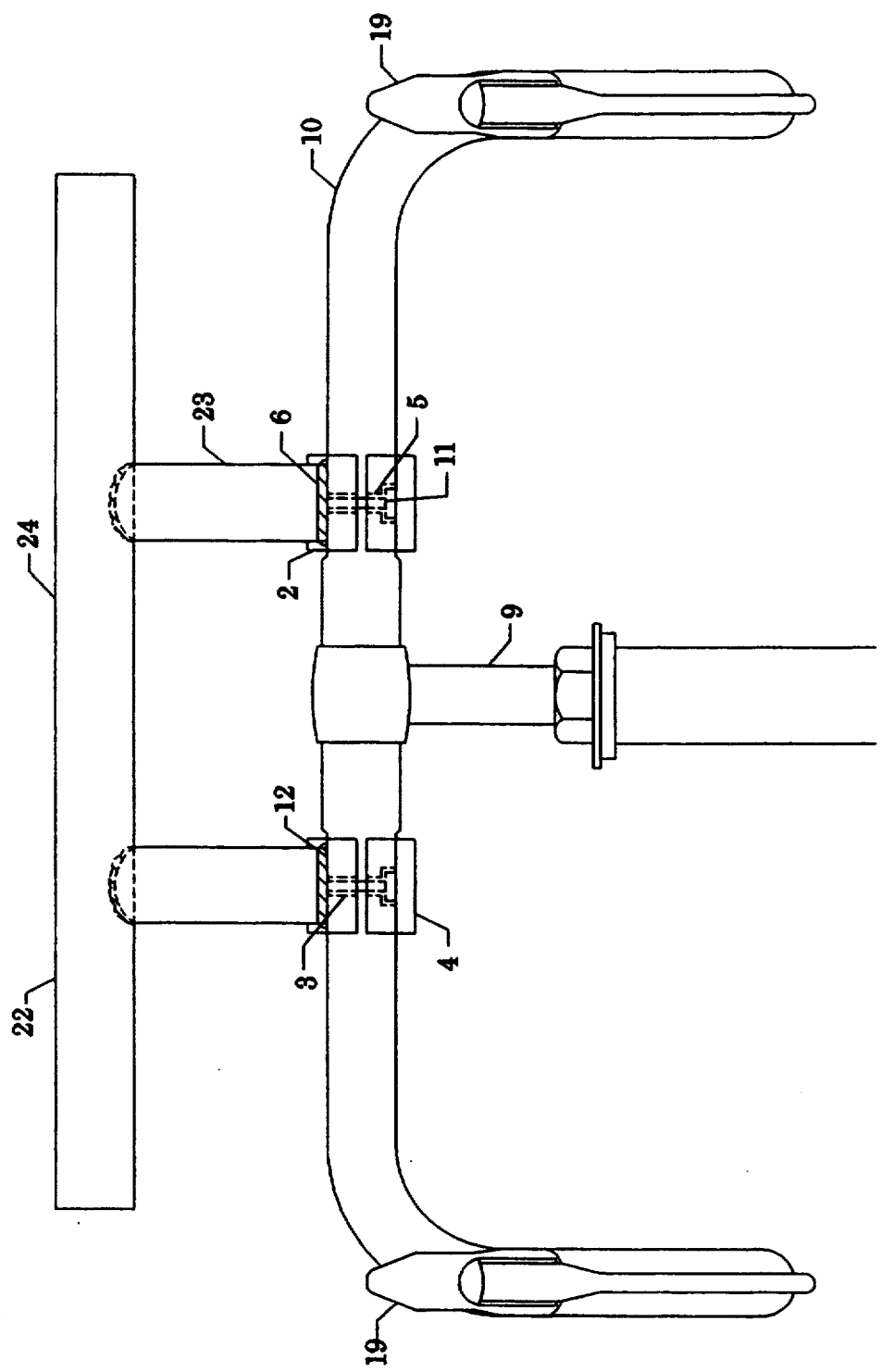
FIG. 6 is a frontal view of an embodiment of the climbing handle which incorporates an enhancement not included in the preferred design. This view is also shown installed on standard handlebars.

FIG. 6 shows a climbing handle for a bicycle comprising, a tubular cross member 22 supported by two tubular standards 23. The area intermediate of said standards 24 is a unique feature because it provides a location to which articles of utility may be conveniently attached. The tubular standards 23 are to be attached by means or a weld, to the two top clips 2 having platforms 12, to attain for the cross member 22, a relationship forward of the top bar of the existing handlebars 10. This requires standards 23 permanently and securely attached to said top clips platforms 12. This embodiment of our invention, using the corresponding bottom clips 4, being capable of attachment to the handlebars of a bicycle when used in coordination with said top clips 2 by installing screws 11 through said bottom clips 4 into said top clips 2.

We claim:

1. A climbing handle for a bicycle comprising, a curved tub, being perpendicular to the handlebar tops of a bicycle, rising above the horizontal plane of the handlebar tops from a top clip, curved away from the center axis of the bicycle to the outside, achieving a relationship parallel to the horizontal plane of the top bar of a bicycle handlebar, being rotated forward so as to restore the proper relationship between the riders shoulders and his hands while riding up hill, a top clip having threaded screw holes, a corresponding bottom clip, having clear screw holes, being capable of attachment to the handlebars of a bicycle, by installing screws through the clear holes of said bottom clip into the threaded holes of said top clip.

2. A climbing handle for a bicycle comprising, a pair of curved tubes rising above the horizontal plane of the handlebar tops of a bicycle from a top clip, a weld so as to permanently and securely attach said tubes to a top clip, a corresponding bottom clip, being capable of attachment to the handlebars of a bicycle, by installing screws through the clear holes of said bottom clip into the threaded holes of said top clip.

3. A climbing handle for a bicycle comprising, a top clip having a platform; to attain a relationship forward of the top bar of the existing handlebars, away from the rider, a handle attached by means of a weld, so as to permanently and securely attach said handle to said top clip platform, a corresponding bottom clip, being capable of attachment to the handlebars of a bicycle, by placing the top clip and bottom clip around the handlebar and installing attachment screws.

4. A climbing handle for a bicycle comprising, a tubular cross member supported by two tubular standards, an area of the cross member intermediate of said standards, to which articles of utility may be conveniently attached, two top clips having platforms to attain for the cross member, a relationship forward of the top bar of existing handlebars, standards permanently and securely attached to said top clip platforms, corresponding bottom clips, being capable of attachment to the handlebars of a bicycle, when used in coordination with said top clips by installing screws through said bottom clips into said top clips.

* * * * *